United States Patent Office 3,461,065
Patented Aug. 12, 1969

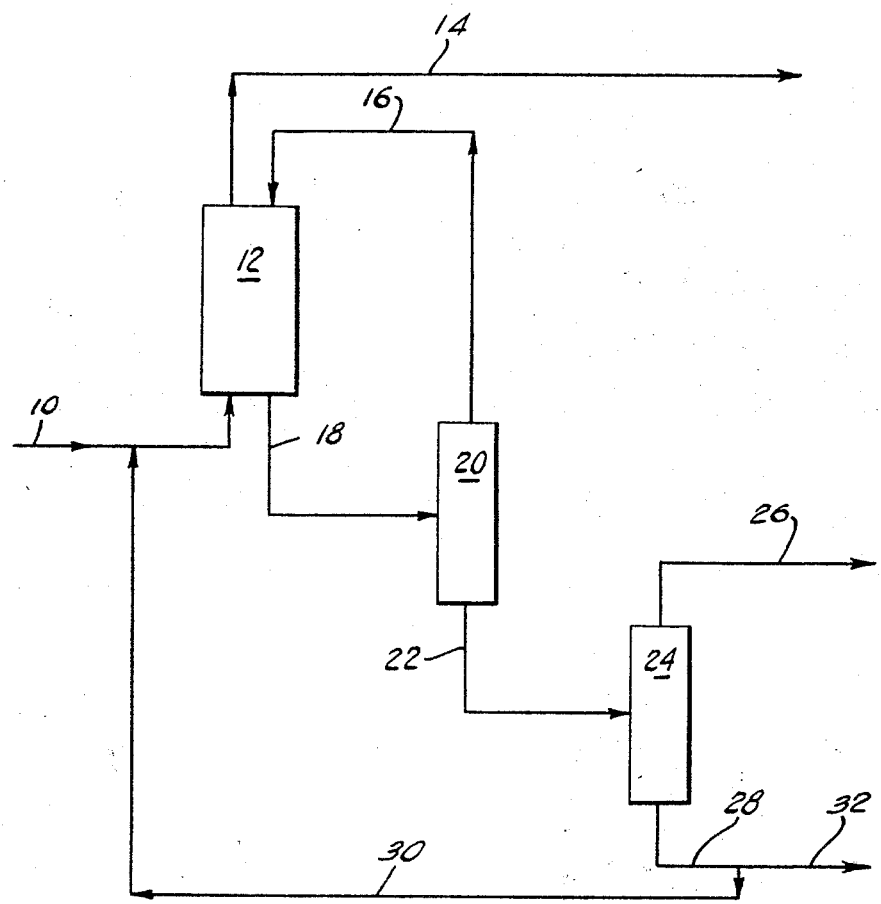

3,461,065
HYDROCARBON SEPARATION PROCESS EMPLOY-
ING CRYSTALLINE ALUMINOSILICATES
David E. Cooper, Greenville, S.C., assignor to Texaco
Inc., New York, N.Y., a corporation of Delaware
Filed July 3, 1967, Ser. No. 650,857
Int. Cl. C10g 25/04
U.S. Cl. 208—310          5 Claims

ABSTRACT OF THE DISCLOSURE

The purity of the more impure of several narrow cut straight chain hydrocarbon streams, separated as a wide cut product from a mixture of straight chain and non-straight chain hydrocarbons by means of a bed of crystalline aluminosilicates and then split into several narrow cut streams by distillation, is substantially improved by recycling and reprocessing through the bed of aluminosilicates a portion of this normally more impure of the narrow cut streams.

Background of the invention

This invention relates to improvements in an absorbent method of separating straight chain hydrocarbons from nonstraight chain hydrocarbons with crystalline zeolitic aluminosilicates, commonly called molecular sieves. More particularly, it relates to improvements in a hydrocarbon separation process employing molecular sieves to produce high purity straight chain hydrocarbons.

Zeolitic molecular sieves are a group of natural and synethtic aluminosilicates whose unique crystalline structure upon dehydration produces a network of crystallographic unit cells interconnected by pores having a precise uniform diameter. These pores permit a sieving or screening action in the molecular size range thereby permitting the separation of molecules based on their average particle diameters. The terms "molecular sieves," "crystalline zeolites" and "aluminosilicates" refer to the same general class of adsorbent materials and are used interchangeably herein.

A particularly striking example of using molecular sieves to separate mixtures based on the average particle diameter of the components is the separation of straight chain hydrocarbons from a mixture of straight chain and nonstraight chain hydrocarbons by contacting the mixture with molecular sieves having uniform pore openings of about 5A. These particular molecular sieves, referred to as a Type 5A sieve, permit the passage of the straight chain hydrocarbons through the pores into the sieve cages where they are adsorbed while rejecting the non-straight hydrocarbons.

Prior art processes employ a cyclic operation when separating the straight chain hydrocarbons from the non-straight chain hydrocarbons in a hydrocarbon stream with molecular sieves. The straight chain hydrocarbons are adsorbed within the sieve cages of the molecular sieves and recovered from the sieves in a desorbing step which usually is accomplished by a change in temperature, pressure, the use of a desorbing fluid or a combination thereof. The straight chain hydrocarbons are seldom recovered as a pure product—a small quantity of nonstraight chain hydrocarbons is usually present as an impurity. At the end of the adsorption step, some of these contaminants are retained in the void spaces of the molecular sieve bed while the more polar of these nonstraight chain hydrocarbons are adsorbed on the surface of the individual sieve particles. Consequently they are removed together with the adsorbate in the sieve cages during the desorption step. To improve the purity of the straight chain hydrocarbon stream the bed is sometimes purged following the adsorption step to remove the hold-up of nonstraight chain hydrocarbons from the sieve bed. Often the purging step is merely the first portion of the desorbing step with the initial effluent, containing a high concentration of the nonstraight chain hydrocarbons, being segregated from the rest of the effluent which contains substantially all of the adsorbed straight hydrocarbons. Since some straight chain hydrocarbons are unavoidably removed during purging, the length of the purging step must be balanced between a short purge removing from the bed a major portion of the nonstraight chain hydrocarbons but substantially none of the adsorbed straight chain hydrocarbons and a long purge removing substantially all the nonstraight chain hydrocarbons from the bed but also a significant quantity of the adsorbed straight chain hydrocarbons.

It is known then that three variables in the molecular sieve separation process affect the purity of the straight chain hydrocarbon product: the amount of straight chain hydrocarbons adsorbed by the molecular sieves, the amount of nonstraight chain hydrocarbons adsorbed on the surface of the sieves and retained in the void spaces of the sieve bed and the severity of the purging step employed between the adsorption and desorption steps.

It is also known that in a molecular sieve-hydrocarbon separation a wide-cut feed may be employed where the number of carbon atoms per molecule may have a spread of 10 or more carbon atoms even though several narrow-cut straight chain hydrocarbon product streams are required. A simple fractionation of the wide-cut straight chain hydrocarbon product will yield the several narrow cut streams desired. However, although the purity of the wide-cut stream may be 95–99.5 weight percent or higher, the several cuts obtained therefrom will not be of equal purity. Some will have a lower purity while others will be purer than the wide-cut product. The nonstraight chain hydrocarbon contaminants, which include the surface adsorbed polar compounds, such as dinuclear aromatics, have a narrower boiling range than the feedstock and therefore are not uniformly distributed in the narrow-cut product streams but are found usually in only one of the straight chain hydrocarbon product streams. This particular narrow-cut product stream, referred to hereinafter for simplicity as "product fraction X" has a lower straight chain hydrocarbon purity than the other product fraction or fractions. When producing several narrow-cut straight chain hydrocarbons it is often desirable to offer all the commercial products with substantially the same degree of purity.

In order to increase the purity of the product fraction X stream a modification of process conditions and variables will achieve a limited measure of success. Although increased purging severity will improve the purity of the wide-cut straight chain hydrocarbon stream with a concomitant improvement in product fraction X, very severe purging conditions are required to produce a product fraction X with a purity above about 98 weight percent. These severe purging conditions are somewhat undesirable because they cause a significant loss of straight chain hydrocarbons in the purge effluent and produce a higher purity than is normally required in narrow cut fractions other than product fraction X. In addition, since the adsorptive capacity of the molecular sieves gradually declines with operating time between regenerations, a point is reached in a relatively short time beyond which a very high purity product fraction X cannot be produced regardless of purging severity.

Rather than processing a wide-cut feed with subsequent fractionation of the wide-cut straight chain hydrocarbons into several narrow cuts, it is possible to use a so-called "blocked-out" operation where a number of narrow cut feedstocks would be processed in the same equipment but in separate and distinct operations. Although this offers the advantage of being able to regulate processing conditions and purging severity to produce the desired purity for each product stream, the attendant problems of segregating feedstocks and "upset" conditions while switching from one feedstock to another resulting in the reprocessing of "off-spec" products do not make this technique the most efficient processing scheme.

It would be desirable therefore to process a wide-cut hydrocarbon feedstock containing both straight chain hydrocarbons and nonstraight chain hydrocarbons producing a multiplicity of narrow-cut straight chain hydrocarbon product streams wherein the purity of the most impure stream may be substantially improved without a significant change in the purity of the other product stream or streams.

Summary of the invention

I have found an improved process for separating wide-cut mixtures of straight chain hydrocarbons and nonstraight chain hydrocarbons into several narrow cut straight chain hydrocarbon streams wherein the purity of the lower purity straight chain hydrocarbon product stream is substantially improved by recycling a portion of this stream and combining it with the wide-cut fresh feed.

When a bed of molecular sieves is being utilized to separate a wide-cut fresh feed of hydrocarbons into a wide-cut stream of high purity straight chain hydrocarbons, a fractionation of this product into two or more narrow cut fractions produces streams of unequal purity because the impurities in the wide-cut product have a narrow boiling range and tend to concentrate in one of the narrow-cut product streams, designated "product fraction X." By recycling a portion of product fraction X and combining it with the fresh feed for reprocessing, the degree of purity of the portion of product fraction X recovered as product will be significantly increased with no substantial change in the purity of the other product stream or streams.

Since the recycled product fraction X is itself a high purity stream of straight chain hydrocarbons, both the amount of nonstraight chain hydrocarbons in the combined streams being charged to the bed of molecular sieves and the amount of nonstraight chain hydrocarbons surface-adsorbed on the sieves remain essentially unchanged. Therefore, the ratio of straight chain hydrocarbons adsorbed within the sieve cages to nonstraight chain hydrocarbons surface adsorbed within the boiling range of product fraction X is increased resulting in a higher purity product fraction X at given purging conditions. The degree of purity improvement is determined by the amount of product fraction X recycled. By varying the quantity of recycle, product fraction X may be produced with a purity lower than, equal to or higher than that of the other narrow cut straight chain hydrocarbons.

Brief description of the drawing

The present invention will be more readily understood by reference to the accompanying drawing which is a schematic flow diagram of the process of the invention wherein a part of the lower purity narrow cut product of straight chain hydrocarbons is recycled for reprocessing with the fresh feed.

Description of the preferred embodiment

My invention may be understood from the following detailed description, taken with reference to the accompanying drawing, which illustrates diagrammatically the preferred embodiment for practicing the process of my invention.

The drawing illustrates a process of separating a wide-cut mixture of straight chain hydrocarbons and non-straight chain hydrocarbons with a bed of molecular sieves into several narrow cut streams of straight chain hydrocarbons wherein the purity of the more impure stream is substantially improved.

The operation is a cyclic one which alternates between an adsorption step and a desorption step. Optionally, a purging operation may follow each adsorption and desorption step. As is well known in the art, the cyclic operation may be made continous by using a series of vessels containing beds of molecular sieves together with the necessary interconnecting piping and valves. Although only one sieve bed vessel is shown in the drawing, the following description is based on the steps concerning this particular vessel, it being understood however, that with a multiplicity of beds a feedstream is continuously being introduced into the system, product streams are continuously being withdrawn and recycle streams are continuously flowing from vessel to vessel.

In the first phase of the cyclic operation a mixture of straight chain hydrocarbons and nonstraight chain hydrocarbons having a wide boiling range of 330 to 510° F., for example, passes through line 10 into vessel 12 containing a fixed bed of molecular sieves having a pore diameter of about 5 A., so-called Type 5A molecular sieves. The sieves are in condition to adsorb straight chain hydrocarbons having been desorbed in the step preceding the adsorption step being described herein. When the desorption was accomplished by a change of pressure or temperature, the sieve cages and the void spaces in the bed will be substantially free of hydrocarbon material. If a nonadsorbable hydrocarbon stream was used as a desorbent medium, the void spaces will be substantially filled with desorbent whereas if the desorbent was an adsorbable material the sieve cages and the void spaces in the bed will also be filled with the desorbent.

The various desorption techniques are well known in the art and the particular method employed in a given molecular sieve separation process does not restrict the usefulness of the present invention. In the following description, the use of a desorbent fluid has been assumed.

As the feed passes through the sieve bed, straight chain hydrocarbons are adsorbed in the sieve cages of the molecular sieves. The effluent flowing from vessel 12 through line 14 is substantially depleted of straight chain hydrocarbons. Any desorbent that may have been present in the sieve bed will be carried out from the sieve bed by the effluent for recovery and reuse, leaving the effluent as an essentially nonstraight chain hydrocarbon product. When the adsorptive capacity of the sieves is fully utilized the feed stream is switched from sieve bed vessel 12 to another of the sieve beds and the desorption step commences in vessel 12.

The adsorbed hydrocarbons may be desorbed by a displacement technique using an adsorbable material which is less strongly adsorbed than the material being desorbed, i.e., a straight chain hydrocarbon having a lower molecular weight than the straight chain hydrocarbons adsorbed on the sieve. For example, when a $C_{10}$–$C_{15}$ hydrocarbon feedstock is processed, n-heptane may effectively be used as a desorbent. The desorption stream flows into sieve vessel 12 from line 16. The resulting desorption effluent is withdrawn from vessel 12 by means of line 18. The effluent contains the desorption medium together with the desorbed straight chain hydrocarbons recovered from the sieve bed, and a small quantity of nonstraight chain hydrocarbons which was adsorbed on the surface of the sieves and held up in the void spaces of the bed. The effluent flows through line 18 into fractionator 20 where the desorbent medium is recovered as an overhead stream flowing through line 16. The wide-cut straight chain hydrocarbons are recovered as a bottoms product flowing through line 22 to a second fractionator 24 where they are separated into the desired narrow cut straight chain hydrocarbon streams. Where two product streams are desired, one is recovered as an overhead stream passing through line 26 while the second is a bottoms product recovered through line 28. Both of the narrow-cut fractions will contain some of the nonstraight chain hydrocarbons recovered from the bed. Since the surface adsorbed hydrocarbons will tend to concentrate in one of these narrow-cut product streams, that stream will contain the major portion of the nonstraight chain hydrocarbon impurities. This stream, designated "product fraction X" has a significantly lower purity than the other stream. Where it is the bottoms product which contains the bulk of the impurities, a portion of this stream passes from line 28 into line 30 and is recycled back to and combined with the fresh feed flowing in line 10. Alternately, where the overhead product is the more impure, a portion of this stream will be recycled instead. The amount of recycle is adjusted to produce product stream 32 having the desired purity.

The following is a description by way of example of a method of carrying out the process of the present invention.

A hydrocarbon feed stream, containing 25 weight percent $C_{10}$–$C_{15}$ straight chain hydrocarbons together with 75 weight percent $C_{10}$–$C_{15}$ nonstraight chain hydrocarbons of equal boiling range, is processed in two runs, the first demonstrating the prior art and the second the method of my invention. Reference to the drawing will be used to demonstrate both runs. In illustrating the prior art separation process, the straight chain hydrocarbons are separated from the nonstraight chain hydrocarbons by means of a bed of molecular sieves contained in sieve vessel 12. Then a stream of n-heptane is used to remove the adsorbed straight chain hydrocarbons together with the surface-adsorbed nonstraight chain hydrocarbons which are mostly $C_{14}$–$C_{15}$ dinuclear aromatics. The effluent passes to fractionator 20 where the heptane is recovered as the overhead and the $C_{10}$–$C_{15}$ hydrocarbons as the bottoms. This bottoms stream is separated into $C_{10}$–$C_{13}$ and $C_{14}$–$C_{15}$ fractions in fractionator 24. The overhead product of $C_{10}$–$C_{13}$ straight chain hydrocarbons is 98 weight percent pure whereas the $C_{14}$–$C_{15}$ straight chain hydrocarbon bottoms product is about 95 weight percent pure.

In the run demonstrating the process of my invention the separation is performed as in the prior art process except that a major portion of the $C_{14}$–$C_{15}$ straight chain hydrocarbon stream recovered as the bottoms in fractionator 24 is recycled through line 30 back to be combined with the fresh feed. When 65–70 percent of the $C_{14}$–$C_{15}$ fraction is recycled, the purity of the $C_{14}$–$C_{15}$ product is increased to about 98 weight percent so as to equal that of the $C_{10}$–$C_{13}$ product. By adjusting the amount of recycle the purity of the $C_{14}$–$C_{15}$ product can be made lower or higher than 98 weight percent.

Table I below presents a material balance of these two runs together with the composition of the several streams which are identified by the number associated with that stream in the flowplan drawing. The straight chain hydrocarbons are referred to as n-paraffins; the nonstraight chain hydrocarbons as nonnormal paraffins.

The ultimate purity of the product fraction X stream is dependent principally on the efficiency of the molecular sieve separation process and the proportion of this stream which is recycled. Although the absolute purity of product fraction X is not directly dependent on the purity of the other narrow cut product stream the proportion of product fraction X which is recycled will influence the relative purities of these narrow cut product streams. Thus, as shown in Table I, when 97 weight percent pure, wide-cut product stream is fractionated, the product fraction X stream is 95 weight percent pure while the other narrow-cut product stream is 98 weight percent pure. By varying the amount of product fraction X being recycled, product fraction X of any desired purity, within a desirable range, for example from 95 up to about 99 weight percent can be obtained when the wide-cut product stream purity ranges from 98 to 99 weight percent and the other narrow-cut product stream purity ranges from 98 to 99 weight percent.

Those skilled in the art will appreciate that narrow cut straight chain hydrocarbons having other purity ranges can be produced by modifying the processing conditions of the molecular sieve separation and the quantity of product fraction X which is recycled.

TABLE I.—PRIOR ART PROCESS

| Stream No | 10 | 14 | 22 | 26 | 32 | 30 |
|---|---|---|---|---|---|---|
| Stream Description | Fresh Feed | Non-Normal Paraffin Product | Wide Cut n-Paraffin | $C_{10}$–$C_{13}$ n-Paraffin Product | $C_{14}$–$C_{15}$ n-Paraffin Product | $C_{14}$–$C_{15}$ n-Paraffin Recycle |
| Rate, lbs./hr | 1,000 | 743 | 257 | 204 | 53 | |
| n-Paraffin Content, wt. percent | 25 | | 97 | 98 | 95 | |
| Composition, lbs./hr.: | | | | | | |
| $C_{10}$–$C_{13}$ n-Paraffins | 200 | | 200 | 200 | | |
| $C_{14}$–$C_{15}$ n-Paraffins | 50 | | 50 | | 50 | |
| Total Non-Normal Paraffins | 750 | 743 | 7 | 4 | 3 | |

IMPROVED PROCESS

| Rate, lbs./hr | 1,000 | 745 | 367 | 204 | 51 | 112 |
|---|---|---|---|---|---|---|
| n-Paraffin Content, wt. percent | 25 | | 98 | 98 | 98 | 98 |
| Composition, lbs./hr.: | | | | | | |
| $C_{10}$–$C_{13}$ n-Paraffins | 200 | | 200 | 200 | | |
| $C_{14}$–$C_{15}$ n-Paraffins | 50 | | 160 | | 50 | 110 |
| Total Non-Normal Paraffins | 750 | 745 | 7 | 4 | 1 | 2 |

I claim:
1. A hydrocarbon separation process which comprises:
   (1) passing a mixture comprising a hydrocarbon feedstock containing straight chain hydrocarbon and nonstraight chain hydrocarbons into contact with a bed of crystalline aluminosilicates effecting a separation of said mixture into a first fraction consisting essentially of straight chain hydrocarbons and containing a small quantity of nonstraight chain hydrocarbons and a second fraction consisting essentially of nonstraight chain hydrocarbons;
   (2) separating said first fraction into a third fraction consisting essentially of straight chain hydrocarbons and containing a major portion of the nonstraight chain hydrocarbons of said first fraction, said nonstraight chain hydrocarbons having substantially the same boiling point range as the straight chain hydrocarbons in said third fraction, and a fourth fraction consisting essentially of straight chain hydrocarbons and containing a minor portion of the nonstraight chain hydrocarbons of said first fraction, said nonstraight chain hydrocarbons having substantially the same boiling point range as the straight chain hydrocarbons in the fourth fraction, said third fraction and said fourth fraction having different boiling point ranges; and
   (3) passing a portion of said third fraction into contact with said bed of aluminosilicates as a portion of said feedstock.

2. A process according to claim 1 wherein the feedstock comprises $C_{10}$–$C_{15}$ straight chain hydrocarbons and $C_{10}$–$C_{15}$ nonstraight chain hydrocarbons, said third fraction comprises $C_{14}$–$C_{15}$ hydrocarbons and said fourth fraction comprises $C_{10}$–$C_{13}$ hydrocarbons.

3. A process according to claim 2 wherein the separation means in step (2) in distillation.

4. A process according to claim 2 wherein the percentage of straight chain hydrocarbons in the fractions is as follows:
  in the first fraction, at least 97 weight percent;
  in the third fraction, at least 95 weight percent and
  in the fourth fraction, at least 98 weight percent.

5. A process according to claim 3 wherein the percentage of straight chain hydrocarbons in the fractions is:
  in the first fraction, between 98 and 99 weight percent;
  in the third fraction, between 95 and 99 weight percent and
  in the fourth fraction, between 98 and 99 weight percent.

References Cited

UNITED STATES PATENTS

| | | | |
|---|---|---|---|
| 2,935,467 | 5/1960 | Fleck et al. | 208—310 |
| 2,956,089 | 10/1960 | Mattox et al. | 208—310 |
| 3,291,726 | 12/1966 | Broughton | 208—310 |
| 3,378,486 | 4/1968 | Powers et al. | 208—310 |

HERBERT LEVINE, Primary Examiner

U.S. Cl. X.R.

260—676